United States Patent [19]

Antonov et al.

[11] Patent Number: 5,036,401
[45] Date of Patent: Jul. 30, 1991

[54] DEVICE FOR DISPLAY OF INFORMATION WITH COMPLETE SCANNING BEAM ARREST

[76] Inventors: Alexandr A. Antonov, prospekt Vernadskogo 85, kv. 64; Vyacheslav V. Petrov, ulitsa Montazhnikov, 104; Olga I. Antonova, prospekt Vernadskogo, 85, kv. 64, all of Kiev, U.S.S.R.

[21] Appl. No.: 457,824

[22] PCT Filed: Apr. 14, 1988

[86] PCT No.: PCT/SU88/00079
§ 371 Date: Jan. 18, 1990
§ 102(e) Date: Jan. 18, 1990

[87] PCT Pub. No.: WO89/10038
PCT Pub. Date: Oct. 19, 1989

[51] Int. Cl.[5] .............................................. H04N 5/68
[52] U.S. Cl. ..................................... 358/242; 358/166; 358/64; 358/148; 358/150
[58] Field of Search ............... 358/166, 162, 150, 148, 358/64, 242, 60

[56] References Cited

U.S. PATENT DOCUMENTS 2,678,964 5/1954 Loughlin .
4,080,628 3/1978 Jirka .
4,185,301 1/1980 Mitsuda .
4,309,725 1/1982 Groeneweg .

FOREIGN PATENT DOCUMENTS

2456451 5/1980 France .
2568434 1/1986 France .
1601319 10/1981 United Kingdom .
2089623 6/1982 United Kingdom .

Primary Examiner—Joseph A. Orsino
Assistant Examiner—Glenn W. Brown
Attorney, Agent, or Firm—Lilling and Lilling

[57] ABSTRACT

A device for display of information has a receiver-amplifier unit connected to a source of an information signal, horizontal and vertical scanning generators, a converter of the signal into the displayed image, which is connected to the horizontal and vertical scanning generators, an output amplifier, a detector of image contours, connected to the receiver-amplifier unit, a threshold unit connected to the image contour detector, a control signal generator connected to the threshold unit and the output amplifier. Thus, complete scanning beam arrest is accomplished.

8 Claims, 10 Drawing Sheets

DEVICE FOR DISPLAY OF INFORMATION WITH COMPLETE SCANNING BEAM ARREST

BACKGROUND OF THE INVENTION

TECHNICAL FIELD

1. Field of the Invention

This invention relates to picture transmission techniques, e.g. television systems using, in particular, line-by-line or interlaced scanning, and is, more specifically, concerned with devices for data display.

2. Description of the Related Art

Known in the art is a device for display of information (U.S. Pat. No. 2,678,964), comprising a high-frequency amplifier, a frequency converter, an intermediate frequency amplifier, a video detector, a video amplifier, a sound channel, line and frame generators, a picture tube featuring a deflection system, and some other additional units intended to improve the sharpness of the picture. In this prior art device, the sharpness of the picture is achieved by slowing down the speed of the line scanning, when reproducing the image outlines, or, in other words, in response to any fast changes in the brightness of the picture. To this end, the device additionally comprises several series-connected units, such as an image contour detector, an output amplifier, and one more line deflecting coil (apart from the coil of the deflection system) or line deflecting plates. In this device, the input of the image contour detectors is connected to the output or input of the video amplifier. This image contour detector comprises one or two differentiating circuits and may include a signal level limiter.

The disadvantage of this data display device consists in that the enhancement in the sharpness of the picture is not substantial. This is due to the non-rectangular shape of the signal produced by the image contour detector. Since the duration of this signal is equal to the duration of the edge of the video signal from which it is produced, this signal has an intricate shape containing several alternating halfwaves. The scanning beam is therefore arrested for only a part of the duration of the video signal edge and not for the complete duration thereof.

Known in the art is a data display system (U.S. Pat. No. 4,080,628) comprising a high frequency amplifier, a frequency converter, an intermediate frequency amplifier, a video detector, a video amplifier, a sound channel, line and frame generators, a picture tube with a deflection system, an image contour detector, an output amplifier, and one more line deflection coil (in addition to the coil in the deflection system) or line deflection plates. In the image contour detector, the output signal is produced by differentiating the video signal, full wave limitation of this video signal, summing the limited signal with the initial video signal, and subsequent second differentiation of the obtained sum. This signal is supplied, via an output amplifier, to horizontal deflecting plates or horizontal deflection coils.

This known system is deficient in that the scanning beam is arrested, to display the image edges, only for a period much shorter than the duration of a respective edge of the video signal. The enhancement of the sharpness of the picture is therefore not substantial.

SUMMARY OF THE INVENTION

The invention is to provide a data display system having a circuit making it possible to achieve a complete stop of the scanning beam for the period during which the luminance of the displayed image, which depends on the video signal applied to the picture tube, changes in order to substantially enhance the sharpness of the picture and, consequently, the reliability of the displayed image.

The invention consists in that a data display device comprising a receiver-amplifier unit having a line synchronization output, a frame synchronization output, at least one information output, and an input connected to an information signal source, and designed to receive, amplify, and isolate an information video signal, and to separate the line and frame sync signals, horizontal and vertical generators producing a standard pattern and having their inputs connected respectively to line and frame sync outputs of the receiver-amplifier unit, a signal-to-image converter designed to produce the image on the picture tube screen and having its first input connected to the output of the horizontal scanning generator, its second input connected to the output of the vertical generator, and its third input electrically connected to an information output of the receiver-amplifier unit, an output amplifier having its output connected to a fourth input of the signal-to-image converter, a displayed image contour detector designed to produce a signal to control the process of horizontal scanning for displaying the image contours and having its input connected to the information output of the receiver-amplifier unit, according to the invention, comprises a threshold unit connected to the output of the displayed image contour detector and designed to achieve, during display of image contours, a near zero or insignificant speed of the horizontal beam scanning, a control signal generator producing sawtooth voltage when displaying image edges and having its first input connected to the output of the threshold unit, while the output thereof is connected to the input of the output amplifier which is to convert the sawtooth voltage into a sawtooth current producing a deflecting field of the same strength as the field produced by the horizontal scanning generator but of the opposite polarity.

It is preferable that the data display device should comprise a corrector of geometrical distortions of the displayed image, which is to prevent spacial shifts of edges of the displayed image and has its first input connected to the output of the threshold unit, its second input connected to the line sync output of the receiver-amplifier unit, and its output connected to a second input of the control signal generator.

It is possible that the data display device should comprise a corrector of luminance distortions of the displayed image, which is designed to prevent distortions of the luminance levels of the edges of the displayed image and background and which is inserted into the electrical connection between the information output of the receiver-amplifier unit and a third input of the signal-to-image converter, a second input of this luminance distortion corrector being connected to the output of the threshold unit, while its third input is connected to the output of the displayed image geometrical distortion corrector.

It is also possible that the data display device should comprise two additional correctors of image luminance distortions, which are to correct the luminance levels of chrominance signals and which have their first inputs connected respectively to the second and third information outputs of the receiver-amplifier unit, their second inputs connected to the output of the threshold unit, and their third inputs connected to the output of the image geometrical distortion corrector, while the outputs thereof are connected to the fifth and sixth inputs of the signal-to-image converter.

It is reasonable that the image luminance distortion corrector of the data display device should comprise a difference amplifier designed to subtract a signal generated in the threshold unit from the source information signal summed up with the signal fed from the output of the image geometrical distortion corrector, one input of said difference amplifier being connected to the output of the threshold unit, another input thereof being connected to the output of the image geometrical distortion corrector, while a third input thereof is connected to the information output of the receiver-amplifier unit, and the output of the difference amplifier is connected to the input of the signal-to-image converter.

It is also reasonable that the image geometrical distortion corrector should comprise first and second delay units, an analog storage unit, an OR circuit having its first input connected to the output of the threshold unit, its second input connected to the line sync output of the receiver-amplifier unit, and its output connected to inputs of the first delay unit, of the second delay unit, and of the analog storage unit, a logarithmic amplifier, a differentiating unit, a sawtooth voltage generator having its input connected to the output of the first delay unit, while the output thereof is connected to the logarithmic amplifier coupled to the differentiating unit having its output connected to the second input of the analog storage unit, an analog-to-digital converter, a digital-to-analog converter, a digital storage unit having its first input connected to the second delay unit, its second input connected to the output of the analog-to-digital converter coupled to the output of the analog storage unit, while the output of the digital storage unit should be connected to the digital-to-analog converter whose output is the output of the image geometrical distortion corrector, connected to the input of the control signal generator.

It is quite possible that the image geometrical distortion corrector should comprise a peak detector, an electronic switch, an analog shift register, a first delay unit having its input connected to the output of the threshold unit, and its output connected to the peak detector, a second delay unit whose input should be connected to the line sync output of the receiver-amplifier unit, while the output thereof is connected to a control input of the electronic switch having one signal output connected to a common bus and the other signal output connected to a second input of the peak detector having an output connected to a signal input of the analog shift register, an OR circuit having one input connected to the output of the threshold unit, another input connected to the line sync output of the receiver-amplifier unit, and the output thereof is connected to the control input of the analog shift register, a reversible counter, a third delay unit having its input connected to the output of the OR circuit and its output connected to the substracting input of the resersible counter whose summing input is connected to the output of the OR circuit, and a multiplexer having its N signal inputs connected to N outputs of the analog shift register and having M control inputs connected to outputs of the reversible counter, and M log N, while the output of the multiplexer is the output of the image geometrical distortion corrector, connected to the input of the control signal generator.

It is possible that the analog shift register should comprise 2N-1 series-connected analog storage units, uneven storage units having their outputs connected to signal inputs of the multiplexer, and a delay unit having its input connected to control inputs of uneven analog storage units, while the output thereof is connected to control inputs of even analog storage units.

This invention makes it possible to achieve a much higher sharpness of the image displayed on the CRT screen, because it practically eliminates the effect of the limited resolution of pick-up tubes and the limited bandwidth of the communication channel on the sharpness of the displayed image by ensuring a complete arrest of the scanning beam when displaying the edges of the image. It also becomes possible to obtain a high-quality picture even using low-cost portable TV reporting cameras and cheap video tape recorders. The sharpness of the picture remains good when cheap or sophisticated TV equipment is used and practically depends only on the quality of the TV receiver. Enhanced sharpness of the displayed picture achieved by the use of the present invention can also contribute to lessen the eye fatigue caused by watching TV programs.

BRIEF DESCRIPTION OF DRAWINGS

The invention will now be described in greater detail with reference to specific embodiments thereof and accompanying drawings, wherein:

FIGS. 10a, b, c, d, e, f, g, h show curves explanatory of the operation of the data display device of FIG. 1 for a case when pulse-separation average components are defined between the leading edges of the pulses, according to the invention;

FIGS. 11a, b, c, d, e, f, g, h show curves explanatory of the operation of the data display device of FIG. 1 for a case when pulse-separation average components are defined between the trailing edges of these pulses, according to the invention;

FIGS. 12a, b, c, d show curves explanatory of the operation of the image contour detector, according to the invention;

FIGS. 13a, b, c, d, e, f show curves explanatory of the operation of the image luminance distortion corrector of FIG. 4, according to the invention;

FIGS. 14a, b, c, d show curves explanatory of the operation of the image luminance distortion corrector of FIG. 5, according to the invention;

FIGS. 15a, b, c, d, e, f, g, h, i show curves explanatory of the operation of the image geometrical distortion corrector of FIG. 6, according to the invention;

FIGS. 16a, b, c, d, e, f, g, h, i, j, p, r, s, u show curves explanatory of the operation of the geometrical distortion corrector of FIG. 7, according to the invention;

FIGS. 17a, b, c show curves explanatory of the operation of control signal generators illustrated in FIGS. 8 and 9, according to the invention.

DESCRIPTION OF THE PREFERRED EMBODIMENTS

An information display device comprises a receiver-amplifier unit 1 (FIG. 1) having its input connected to an output of an information signal source 2. This information signal source 2 may be an antenna, a tape recorder, a pick-up TV camera. The receiver-amplifier unit 1 employs a known circuit (V. K. Zvorykin et al. Televidenie, 1956, Inostrannaya literatura Publ., Moscow, pp. 528–548) and has the following outputs: a line sync output producing line sync pulses, a frame sync output producing frame sync pulses, and at least one information output. When only black-and-white (or monochrome) picture is displayed, there is only one information output available and the video signal is taken off therefrom. The receiver-amplifier unit 1 is designed to receive, amplify and separate an information video signal, and line and frame synchronization signals.

Figure 1:
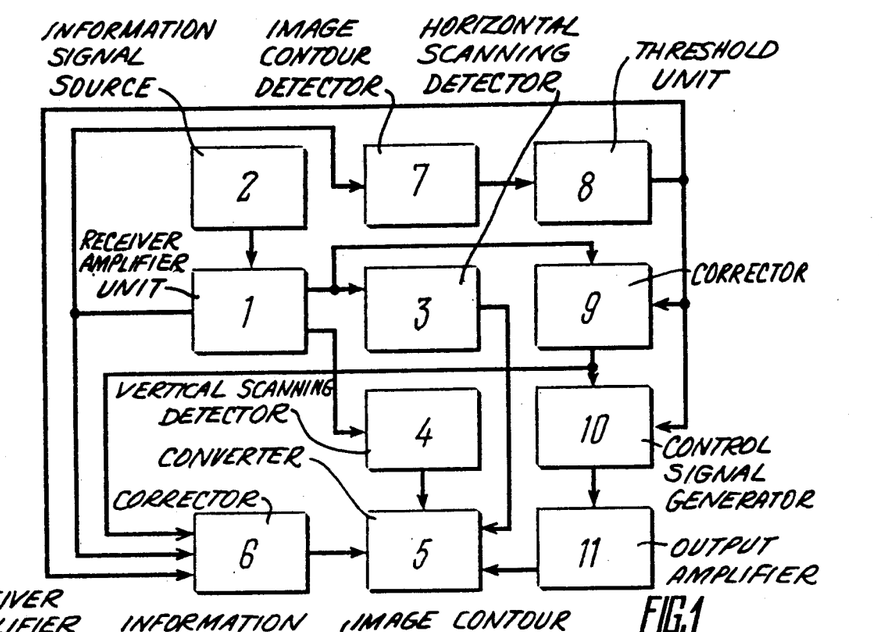
FIG. 1 shows a block diagram of a data display device applicable to monochrome pictures, according to the invention.

The information display device also comprises a horizontal scanning generator 3 and a vertical scanning generator 4, both employing known circuits. The input of the horizontal scanning generator 3 is connected to the line sync output of the receiver-amplifier unit 1. The input of the vertical scanning generator 4 is connected to the frame sync output of the receiver-amplifier unit 1. The horizontal and vertical scanning generators 3 and 4 are designed to produce a standard pattern.

The information display device also comprises a converter 5 of a signal into a displayed image, which may, for example, be made as a picture tube equipped with a deflection system and appropriate power supply circuits and controls. The signal-to-image converter 5 is designed to produce a picture on the screen of the tube. First and second inputs of the signal-to-image converter 5 are connected to outputs of the horizintal and vertical scanning generators 3 and 4 respectively.

The information display device also comprises a corrector 6 of luminance distortions of the displayed image, which has its first input connected to an information output of the receiver-amplifier unit 1, an image contour detector 7 having its input connected to an information output of the receiver-amplifier unit 1 and which is designed to produce control signals for the horizontal scanning process of image contour display.

The information display device also comprises a threshold unit 8, e.g. a comparator or a monovibrator (W. Tietze et al. Poluprovodnikovaya skhemotekhnika, 1983, Mir Publ., Moscow, pp. 286–292), which has its input connected to the output of the image contour detector 7 and is designed to achieve, during display of image edges, the speed of horizontal scanning, which is constant and close to zero. The information display device comprises a corrector 9 of geometrical distortions of the displayed image and a control signal generator 10. The output of the threshold unit 8 is connected to first inputs of the image geometrical distortion corrector 9 and of the control signal generator 10 and to the second input of the image luminance distortion corrector 6. The third input of the image luminance distortion corrector 6 is connected to an output of the image geometrical distortion corrector 9, which is also connected to the second input of the control signal generator 10. The second input of the geometrical distortion corrector 9 is connected to the line sync output of the receiver-amplifier unit 1.

The device for display of information, according to the invention, also comprises an output amplifier 11 designed to convert sawtooth voltage into sawtooth current producing a deflecting field of the same strength as the field produced by the horizontal scanning generator 3, but having the opposite polarity. An output of the control signal generator 10 is connected to the output amplifier 11. This output amplifier 11 may be built around a known circuit (SU, A, 879818). The output of the output amplifier 11 is connected to a fourth input of the signal-to-image converter 5. The third input of the signal-to-image converter 5 is connected to the output of the luminance distortion corrector 6.

Figure 2:
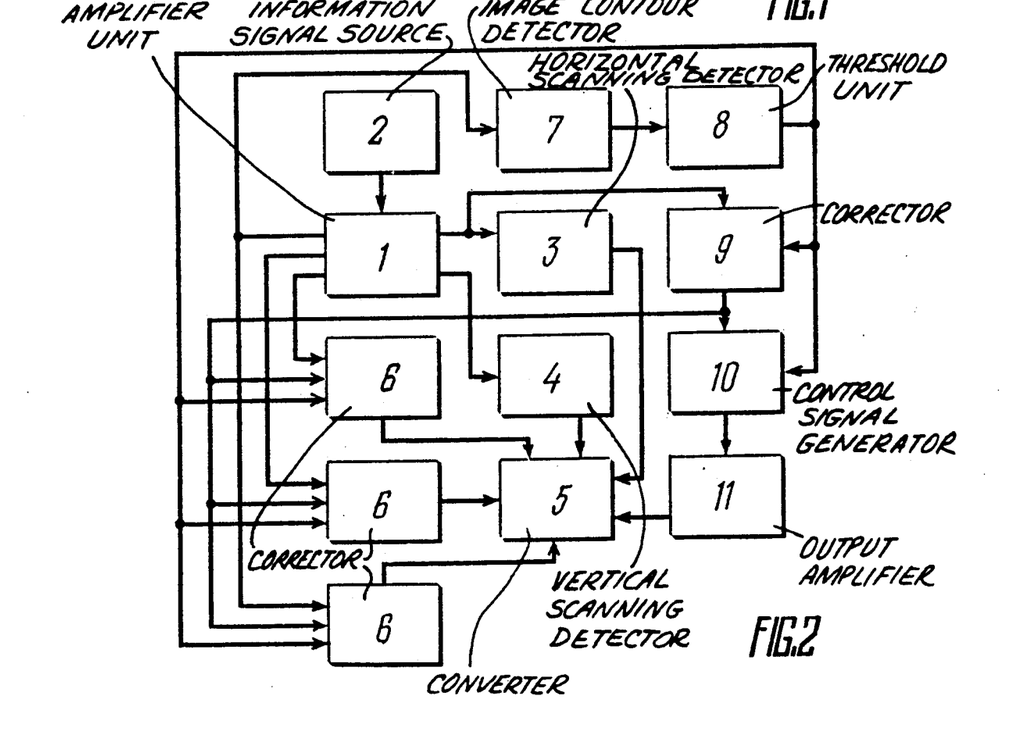
FIG. 2 shows a block diagram of a data display device applicable to color pictures, according to the invention.

To display color information, the functional block diagram of the information display device shown in FIG. 2 is analogous to the functional diagram of the device in FIG. 1 with the following exceptions. The receiver-amplifier unit 1 (FIG. 2) has three information outputs feeding signals for red, green, and blue colors. The information display device also comprises two additional correctors 6 of luminance distortions of the displayed image, which are to correct the brightness levels of chrominance signals and have their first inputs connected, respectively, to the second and third information outputs of the receiver-amplifier unit 1, their second inputs connected to the output of the threshold unit 8, and their third inputs connected to the output of the image geometrical distortion corrector 9, while the outputs thereof are connected to fifth and sixth inputs of the signal-to-image converter 5.

Figure 3:
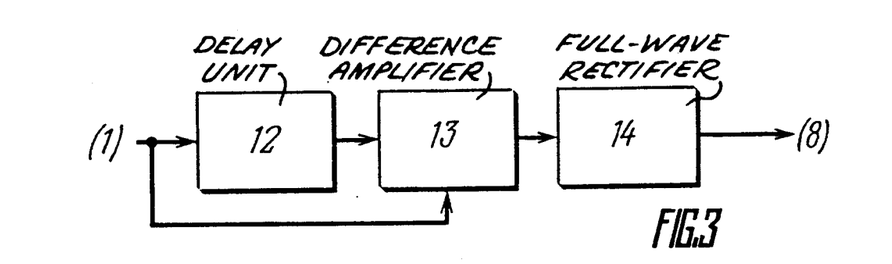
FIG. 3 shows a block diagram of a displayed image contour detector, according to the invention.

The image contour detector 7 comprises the following series-connected components: a delay unit 12 (FIG. 3), e.g. a delay line rated for 50–100 ns, a difference amplifier 13, and a full-wave rectifier 14 (W. Tietze et al. Poluprovodnikovaya skhemotekhnika, 1983, Mir Publ., Moscow, pp. 137–140, 470–472).

The corrector 6 of luminance distortions of the displayed image is designed to prevent distortions of the luminance levels of the image edges and its background and comprises a difference amplifier 15 (FIG. 4) coupled in series to a one-quadrant analog multiplier 16 (W. Tietze et al. Ppoluprovodnikovaya Skhemotekhnika, 1983, Mir Publ., Moscow, pp. 158–165). An inverting input 17 of the difference amplifier 15 is connected to the output of the threshold unit 8, while a non-inverting input 18 is connected to the output of the image geometrical distortion corrector 9.

Figure 4:
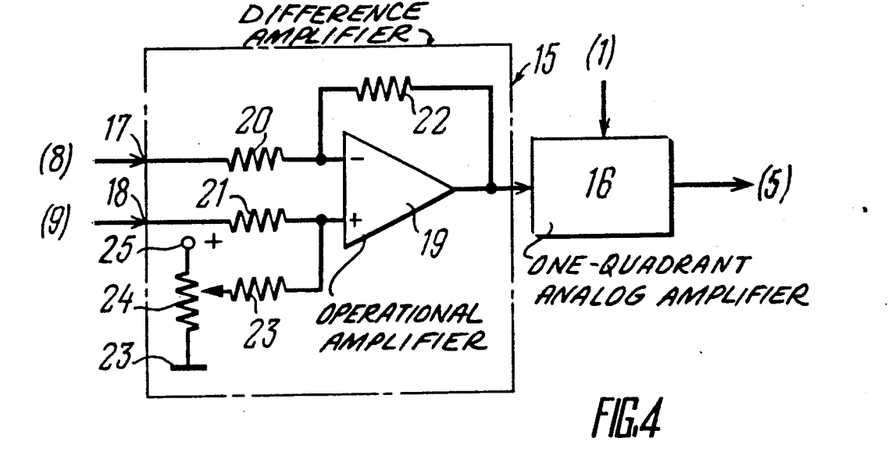
FIG. 4 shows a block diagram of an image luminance distortion corrector equipped with an analog multiplier, according to the invention.

The difference amplifier 15 is built around an operational amplifier 19, for example, see W. Tietze et al. above, pp. 67–72. The inverting input of the operational amplifier 19 is connected to a resistor 20, while the non-inverting input thereof is connected to a resistor 21. A resistor 22 is inserted between the output of the operational amplifier 19 and its inverting input. The movable contact of a potentiometer 24 is connected to the noninverting input of the operational amplifier 19 via a resistor 23, while one of the stationary contacts thereof is connected to a source 25 of constant bias voltage and the other stationary contact is connected to a common bus 26. Another input of the one-quadrant analog multiplier 16 is connected to an information output of the receiver-amplifier unit 1, while the output thereof is connected to the input of the signal-to-image converter 5.

The luminance distortion corrector 6 may be a difference amplifier 27 (FIG. 5) designed to subtract the signal produced in the threshold unit 8 from the source information signal summed up with the signal fed from the output of the geometrical distortion corrector 9. One input of the difference amplifier 27 is connected to an output of the threshold unit 8, another input is connected to the output of the geometrical distortions corrector 9, and a third input is connected to an information output of the receiver-amplifier unit 1. The output of the difference amplifier 27 is connected to the input of the signal-to-image converter 5. The difference amplifier 27 may be built around an operational amplifier 28 whose inverting input is connected to the output of the threshold unit 8 via a resistor 29, while the noninverting input thereof is connected to the output of the geometrical distortion corrector 9 via a resistor 30 and to an information output of the receiver-amplifier unit 1 via a resistor 31. The output of the operational amplifier 28 is connected to the input of the signal-to-image converter 5. A resistor 32 is inserted between the output of the operational amplifier 28 and its inverting input, while a resistor 33 is inserted between the non-inverting input of the operatonal amplifier 28 and the common bus 26.

The corrector 9 of geometrical distortions of the displayed image is designed to prevent any shifts in space of the edges of the displayed image and comprises an OR circuit 34 (FIG. 6) having its first input connected to the threshold unit 8, its second input connected to the line sync output of the receiver-amplifier unit 1. The output of the OR circuit 34 is connected to inputs of a delay unit 35 (e.g. a delay line or a univibrator triggered by the trailing edge of the input pulse), and a delay unit 36 (e.g. a univibrator). The output of the threshold unit 8 and the sync output of the unit 1 are connected to control inputs of an analog storage device 37 (e.g. a sample-and-hold circuit), see W. Tietze et al. Poloprovednikovaya Teknika, 1983, Mir Publ., Moscow, pp. 284–285.

Figure 6:
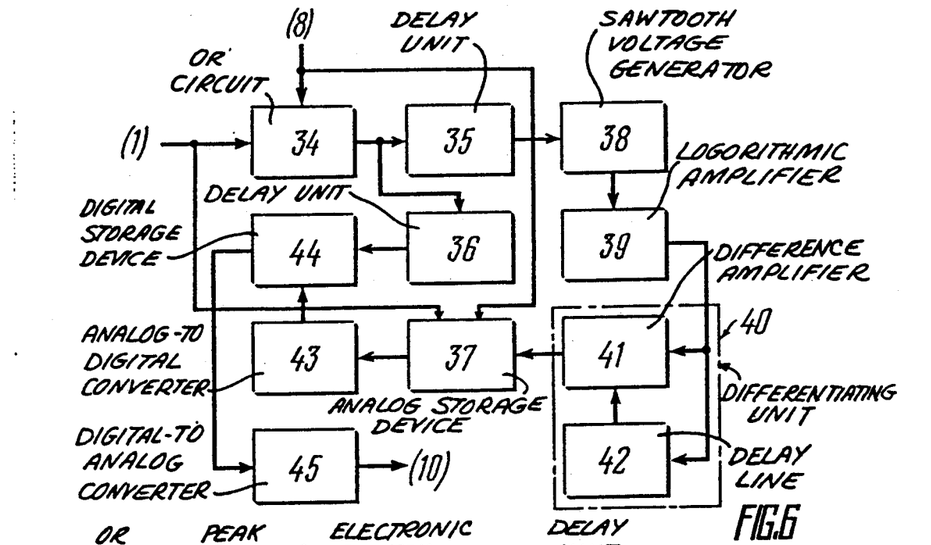
FIG. 6 shows a block diagram of an image geometrical distortion corrector equipped with a digital storage unit, according to the invention.

The output of the delay unit 35 is connected to a sawtooth voltage generator 38 whose output is connected to a logarithmic amplifier 39 (W. Tietze et al., pp. 148–150). The output of the logarithmic amplifier 39 is connected to a differentiating unit 40 which may be, for example, a difference amplifier 41 having a delay line 42 rated for 50–100 ns inserted between its inputs. The output of the differentiating unit 40 is connected to a signal input of the analog storage device 37 having its output connected via an analog-to-digital converter 43 to a digital storage unit 44, e.g. a single-chip storage (W. Tietze et al., pp. 454–464, 392–397). Another input of the digital storage 44 is connected to the output of the delay unit 36 rated for a period approximately equal to the horizontal scan period. The output of the main storage 44 is connected to an input of a digital-to-analog converter 45 (W. Tietze et al., pp. 444–454) having its output, as the output of the geometrical distortion corrector 9, connected to the input of the control signal generator 10.

Figure 7:
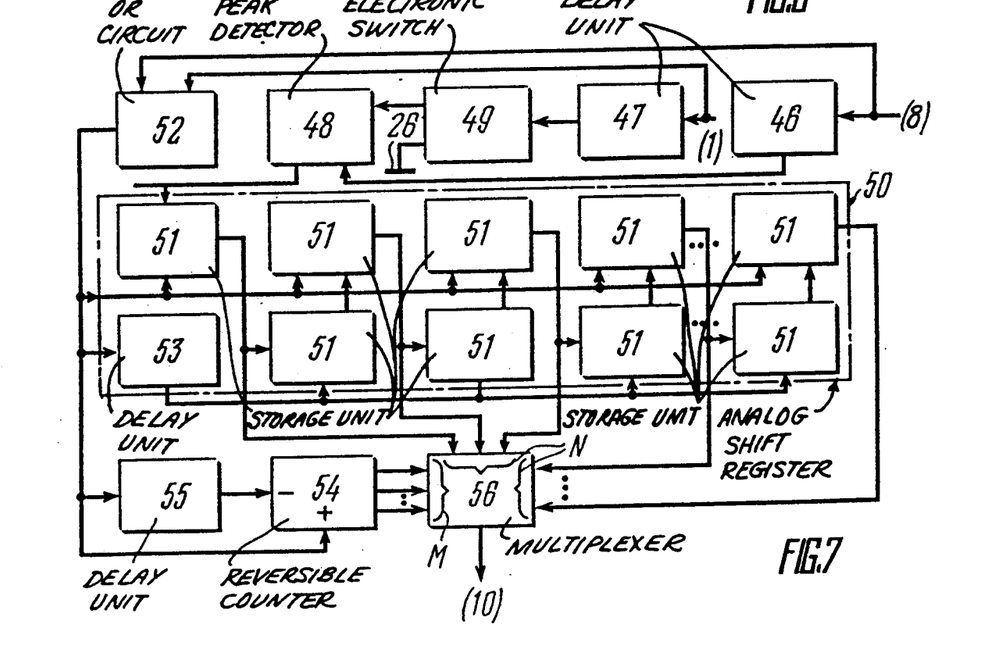
FIG. 7 shows a block diagram of an image geometrical distortion corrector equipped with analog storage units, according to the invention.

The geometrical distortion corrector 9 may be built around another circuit. This embodiment of the corrector 9 has identical delay units 46 and 47 (e.g. univibrators or delay lines) joined to the input thereof. The output of the delay unit 46 is connected to a first input of a peak detector 48 built around a known circuit. The output of the delay unit 47 is connected to a control input of an electronic switch 49 having its first signal output connected to the common bus 26 and its second signal output connected to a second input of the peak detector 48. The output of the peak detector 48 is connected to a signal input of an analog shift register 50. This analog shift register may be realized as a plurality of 2N-1 series-connected analog storage units 51 (e.g. sample-and-hold circuits), where N is the number of signal outputs of the analog shift register 50. Signal outputs of the analog shift register 50 are outputs of the uneven analog storage units 51 whose control inputs are connected to the output of an OR circuit 52 having its first input connected to the output of the threshold unit 8, its second input connected to the line sync output of the receiver-amplifier unit 1. Control inputs of the even analog storage units 51 of the analog shift register 50 are connected to an output of its own delay unit 53 (e.g. a univibrator or a delay line) having its input connected to the output of the OR circuit 52. The output of the OR circuit 52 is connected directly to a summing input of a reversible counter 54 and, via a delay unit 55 (e.g. a univibrator or a delay line), to the substracting input thereof. Outputs of all stages of the reversible counter 54 are connected to control inputs of a multiplexer 56 (W. Tietze et al., pp. 326–328). Besides, the N signal inputs of the multiplexer 56 are series-connected to N outputs of the analog shift register 50. The output of the multiplexer 56 is the output of the geometrical distortion corrector 9, which is connected to the input of the control signal generator 10.

Figure 8:
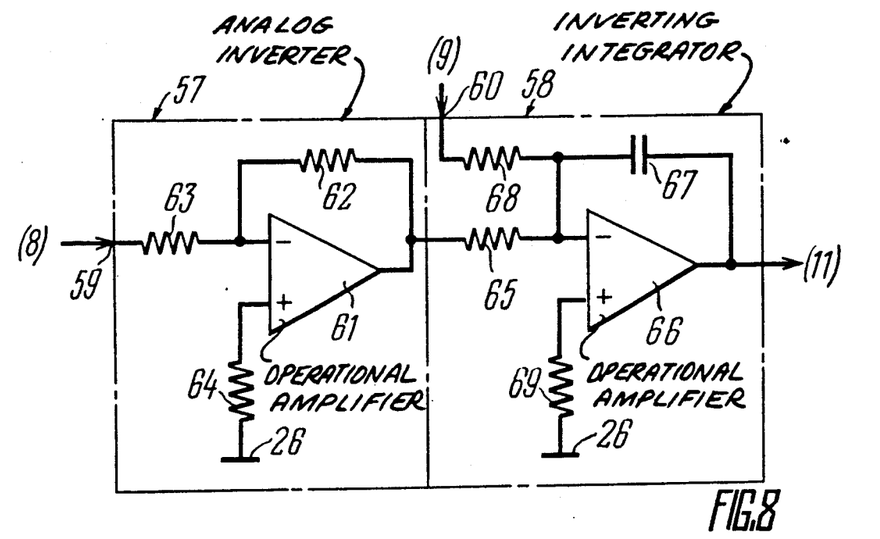
FIG. 8 shows a circuit diagram of a control signal generator equipped with an analog inverter, according to the invention.

The control signal generator 10 produces sawtooth voltage when the image edges are displayed and comprises an analog inverter 57 coupled in series with an inverting integrator 58. An input 59 of the analog inverter 57, which is an input of the control signal generator 10, is connected to the output of the threshold unit 8. An input 60 of the inverting integrator 58, which is another input of the control signal generator 10, is connected to the output of the geometrical distortion corrector 9.

The analog inverter 57 comprises an operational amplifier 61 having its output connected, via a resistor 62, to the first input thereof connected, via a resistor 63, to the input 59 of the analog inverter 57. The second input of the operational amplifier 61 is connected, via a resistor 64, to the common bus 26. The output of the operational amplifier 61 is connected, via a resistor 65 of the inverting integrator 58, to a first input of an operational amplifier 66 having its output connected, via a capacitor 67, to the first input thereof and, via a resistor 68, to the output of the geometrical distortion corrector 9. A second input of the operational amplifier 66 is connected, via a resistor 69, to the common bus 26. The output of the operational amplifier 66 is connected to the output amplifier 11.

Figure 9:
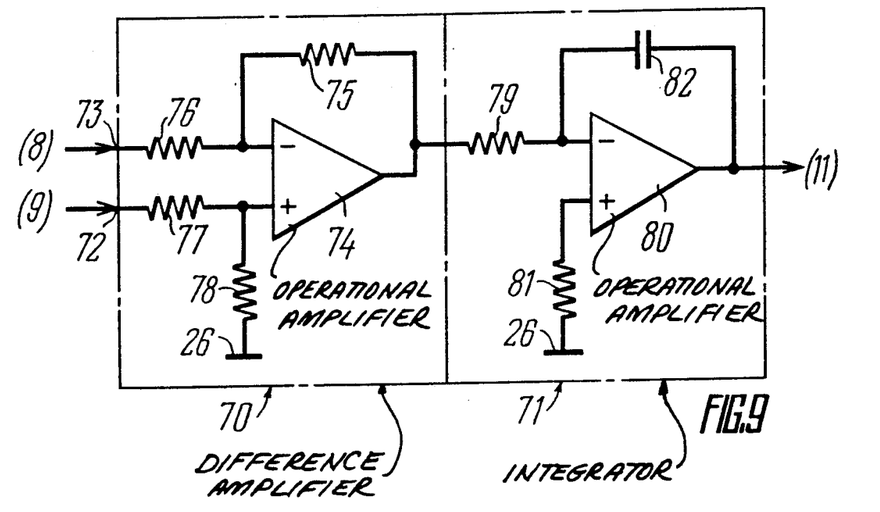
FIG. 9 shows a circuit diagram of a control signal generator featuring an analog difference amplifier, according to the invention.

An alternative embodiment of the control signal generator 10 is made as a difference amplifier 70 coupled in series with an integrator 71. A noninverting input 72 of the difference amplifier 70 is connected to the output of the geometrical distortion corrector 9, while an inverting input 73 thereof is connected to the output of the threshold unit 8.

The difference amplifier 70 comprises an operational amplifier 74 having its output connected, via a resistor 75, to its inverting input and, via a resistor 76, to the output of the threshold unit 8. The noninverting input of the operational amplifier 74 is connected, vis a resistor 77, to the output of the geometrical distortion corrector 9 and, via a resistor 78, to the common bus 26. The output of the operational amplifier 74 is connected, via a resistor 79, to the inverting input of an operational amplifier 80. The operational amplifier 80 has its noninverting input connected, via a resistor 81, to the common bus 26, and its output connected, via a capacitor 82, to the inverting input thereof and the output amplifier 11.

The device for display of information shown in FIG. 1 operates as follows.

Figure 10:
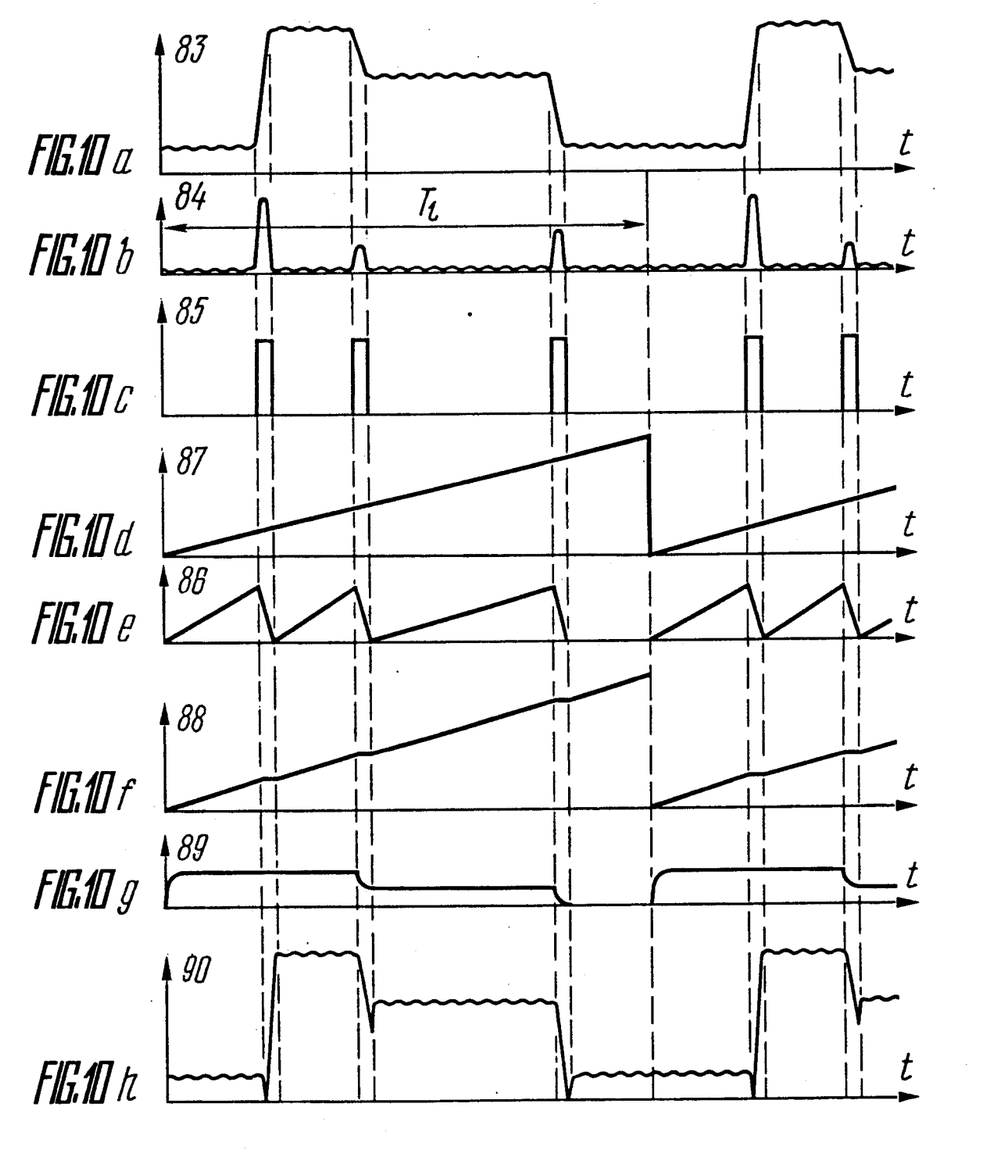
Figure 11:
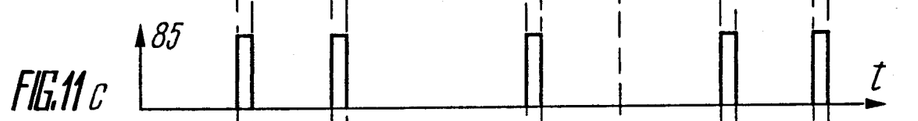

The source information is supplied from the information signal source 2 to the receiver-amplifier unit 1 on a carrier or video frequency. It is converted into horizontal synchronization pulses taken off from the line sync output, vertical synchronization pulses taken off from the frame sync output, and video signals (curve 83 in FIGS. 10a and 11a) taken off from the information output. These pulses have the required magnitude and polarity. Horizontal synchronization pulses are fed to the horizontal scanning generator 3 (FIG. 1) and vertical synchronization pulses are fed to the vertical scanning generator 4, thus providing standard (interlaced) scanning of the picture on the screen of the CRT which is a part of the signal-to-image converter 5. The video signal (curve 83 in FIGS. 10a and 11a) is supplied from the information output of the receiver-amplifier 1 (FIG. 1) to the image contour detector 7, where it is converted into an analog signal which corresponds to the absolute value of the first derivative of the video signal (curve 84 in FIGS. 10b and 11b). This signal is unified in the threshold unit 8, in other words, the signal is transformed into uniform pulses having the same magnitude, and polarity (curve 85 in FIGS. 10c and 11c). These pulses are fed to the control signal generator 10 (FIG. 1) where they are converted into sawtooth voltage (curve 86 in FIGS. 10e and 11e). This sawtooth voltage is converted by the output amplifier 11 into current producing a deflection field having the same strength as the field produced by the horizontal scanning generator 3 (curve 87 in FIGS. 10d and 11d) but the opposite polarity. These fields are algebraically summed up to produce a deflection field (curve 88 in FIGS. 10f and 11f) capable of arresting the scanning beam when displaying the image contours corresponding to respective pulse edges in the original video signal (curve 83 in FIGS. 10a and 11a).

Horizontal portions of the resulting deflecting field (curve 88 in FIGS. 10f and 11f) correspond to the zero scanning speed. Since the beam is arrested practically for the complete period while the video signal fed to the tube changes, the sharpness of the displayed image is increased by a factor of more than two, that is almost to the maximum. Since the beam scanning speed control channel in the herein disclosed device comprises the threshold unit 8, the dependence of the improvement in the sharpness of the picture on the signal swing is completely eliminated. On the other hand, to keep the brightness of the screen from growing during the display of image contours due to the well known relation between the luminance and scanning speed, the video signal magnitude should be additionally changed to match the changes in the beam scanning speed (curves 89 and 90 in FIGS. 10g, 11g, 10h and 11h). This is realized in the corrector 6 of the luminance distortions of the displayed image, which is inserted between the information output of the receiver-amplifier unit 1 and the third input of the signal-to-image converter 5.

In order to prevent geometrical distortions of the displayed image due to modulation of the scanning speed, the beam should move faster to display the background as compared to the situation where the scanning speed is not modulated. This accelerated beam speed should be exactly the same as if the beam displays the image contours in the same places when no modulation of the scanning speed is available. To this end, the average speed of the electronic beam between any two adjacent contours should be constant and equal to the average speed of the beam over the pattern. This can be achieved in two ways: when the beam moves faster in the background portion of the picture and stops to display the image contour (curve 88 in FIG. 10f), that is when the average beam speed between the trailing edges of adjacent contours is constant, or, in the second way, when the beam stops at the contour and then moves faster at the adjacent background portion (curve 88 in FIG. 11f), that is when the average scanning speed is kept constant between the forward edges of any two adjacent image contours. This program is realized in the corrector 9 of geometrical distortions of the displayed image.

Introduction of the luminance distortion corrector 6 and the geometrical distortion corrector 9 into the information display device can completely eliminate any distortions of the picture.

The information display device shown in FIG. 2 is different from the device of FIG. 1 described above in that it is adapted for display of color information. In consequence, three video signals, and not one, corresponding to red, green and blue colors are supplied from the receiver-amplifier unit 1 to the signal-to-image converter 5. Each such video signal passes through its own corrector $6_1$, $6_2$, $6_3$, of luminance distortions of the displayed image.

Figure 12:
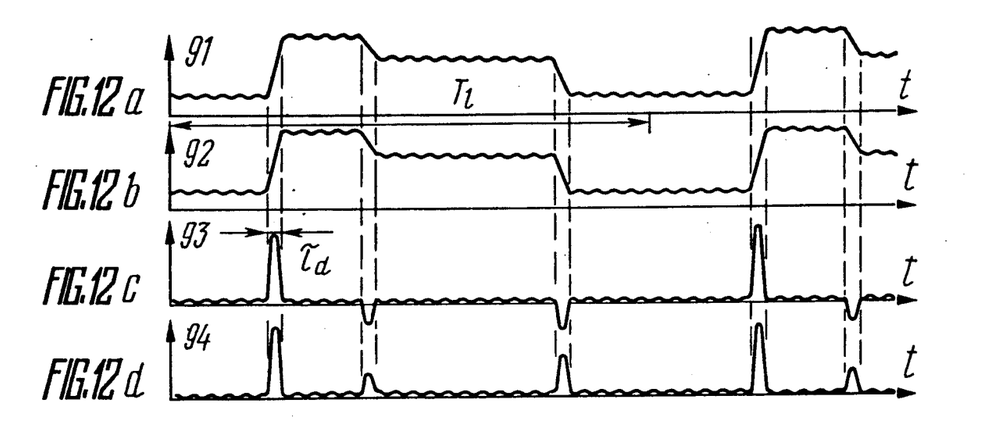

The image contour detector 7 (FIG. 3) operates as follows. In the differentiating unit comprising the delay unit 12 and difference amplifier 13, the input video signal (curve 91 in FIG. 12a) is differentiated by finding the difference between the original video signal and the video signal (curve 92 in FIG. 12b) delay unit 12 for a period of approximately 50–100 ns. The differentiated video signal (curve 93 in FIG. 12c) is further carried through the full-wave rectifier 14 in order to find its absolute value (curve 94 in FIG. 12d).

Figure 13:
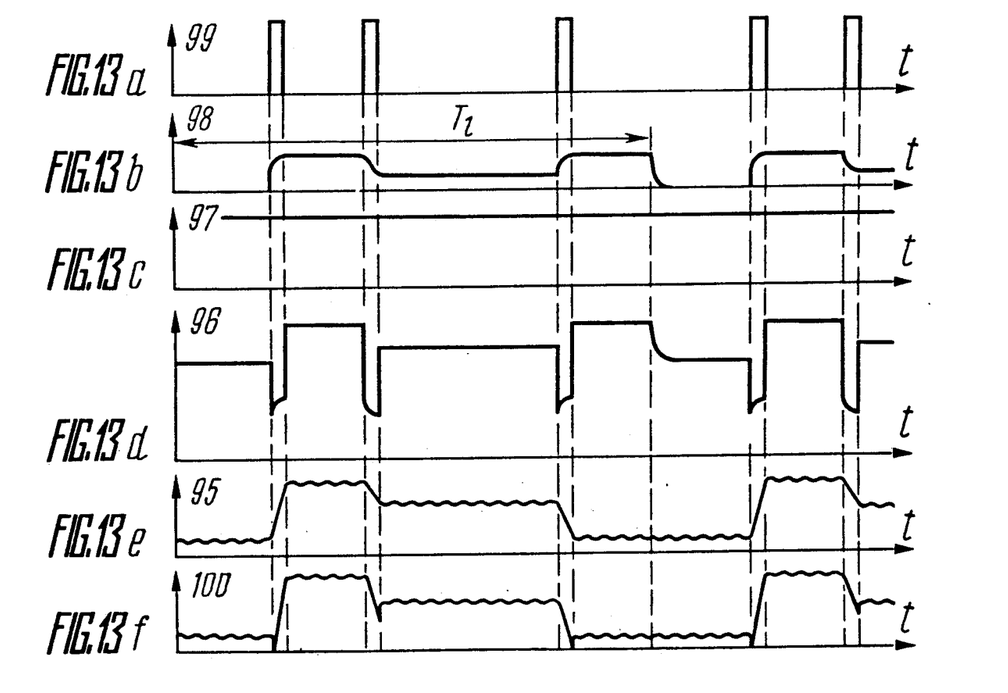

The corrector 6 of luminance distortions of the displayed image, shown in FIG. 4, eliminates spurious brightness modulation of the image by multiplying the video signal (curve 95 in FIG. 13e) by the signal (curve 96 in FIG. 13d) which is the function of the instantaneous scanning speed. The signal proportional to the actual scanning speed (curve 96 in FIG. 13d) is produced by adding together the signals proportional to the average (for a period) scanning speed (curve 97 in FIG. 13c) and to the interpulse average scanning speed (curve 98 in FIG. 13b) and subtracting therefrom, for the period of displaying image contours, the average (for a period) scanning speed (curve 99 in FIG. 13a), that is the speed of the action retarding the scanning beam. The signal proportional to the instantaneous scanning speed (curve 96 in FIG. 13d) is multiplied, in the one-quadrant multiplier 16 (FIG. 4), by the original video signal (curve 95 in FIG. 13e) in order to correct the video signal (curve 100 in FIG. 13f).

Figure 5:
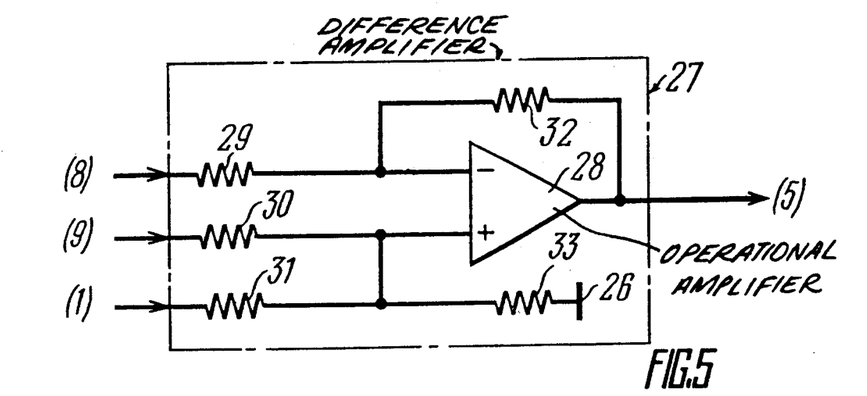
FIG. 5 shows a block diagram of an image luminance distortion corrector without the analog multiplier, according to the invention.
Figure 14:
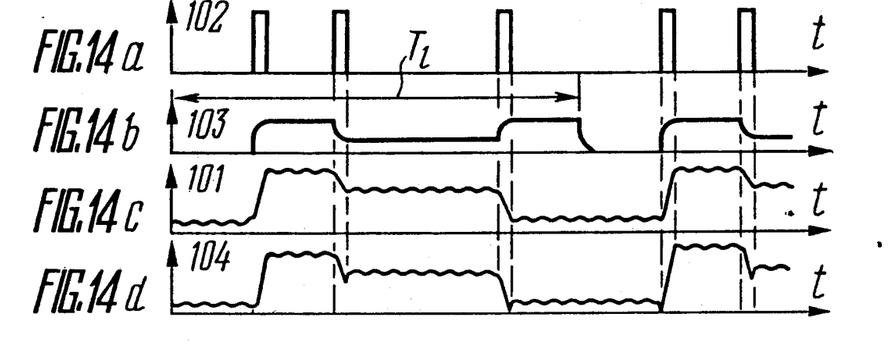

Referring to FIG. 5, a simpler embodiment of the corrector 6 of luminance distortions of the displayed image has a circuit without the analog multiplier. To reduce the brightness of image contours when the beam is arrested, pulses (curve 102 in FIG. 14a) fed from the threshold unit 8 are added to the original video signal (curve 101 in FIG. 14c). Also, in order to somewhat increase the brightness of the inter-contour background which is scanned at a somewhat higher speed, the original video signal is mixed with the signal (curve 103 in FIG. 14b) of the interpulse average component, which is taken from the output of the geometrical distortion corrector 9 and, consequently, the video signal is corrected (curve 104 in FIG. 14d). The optimal balance between the video signal (curve 101 in FIG. 14c) and contour brightness suppressing pulses (curve 102 in FIG. 14a) can be achieved by proper selection of resistors 29 (FIG. 5) and 32 in the circuit of the luminance distortion corrector 6. The optimal balance between the video signal (curve 101 in FIG. 14c) and interpulse average components (curve 103 in FIG. 14b) can be achieved by proper selection of resistors 30 (FIG. 5), 33 and 31 in the circuit of the corrector 6.

The corrector 9 of geometrical distortions of the displayed image, whose functional block diagram is shown in FIG. 6, operates as follows.

Since the magnitude of the pulse-to-pulse average component should be inversely proportional to the duration of the interval between adjacent beam arresting pulses, the corrector 9 should in some way realize the hyperbolic relationship between the magnitude of the interpulse average and the duration of a respective time interval. Besides, the magnitude of the interpulse average component should be known at the very beginning of this interpulse time interval, when its duration is not yet apparent. It is for this reason, that the geometrical distortion corrector 9 should inevitably comprise a buffer storage and the sought-for information is to be produced at the output of the corrector 9 with a specific constant delay, e.g. for the horizontal scan period $T_1$.

Figure 15:
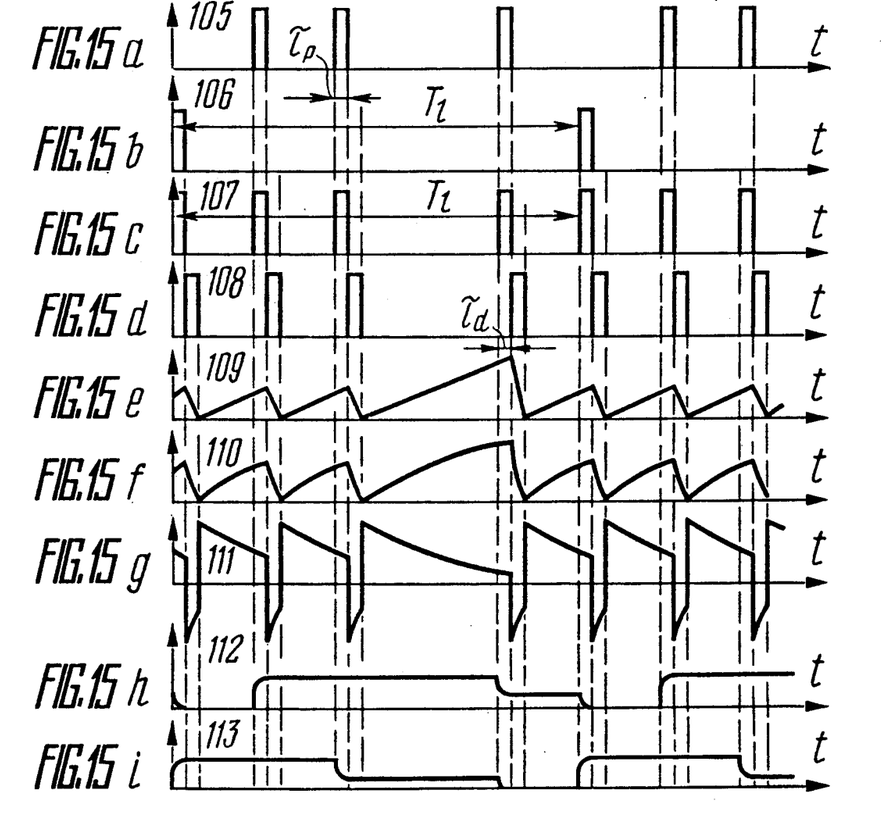

The circuit of the geometrical distortion corrector 9 comprises the sawtooth generator 38, logarithmic amplifier 39, and differentiating unit 40, which together realize the hyperbolic relationship in accordance with known mathematical formulas. The buffer storage in this case is the digital storage unit 44. Pulses are fed to the input of the geometrical distortion corrector 9 from the output of the threshold unit 8 (curve 105 in FIG. 15a), together with line sync pulses from the line sync output of the receiver-amplifier unit 1 (curve 106 in FIG. 15b). These pulses are united (curve 107 in FIG. 15c) in the OR circuit 34. Then they are sent through the delay unit 35 where they are delayed for a period approximately equal to the duration of the pulses, that is $\tau_d = \tau_p$ (curve 108 in FIG. 15d). Next, these pulses are converted in the sawtooth generator 38 into triangular pulses (curve 109 in FIG. 15e) whose swing is proportional to the pulse separation (the length of the interpulse interval). Then the pulses are converted in the logarithmical amplifier 39 into pulses (curve 110 in FIG. 15f) whose swing is proportional to the logarithm of interpulse intervals. Further on, in the differentiating unit 40, the pulses are converted into signals (curve 111 in FIG. 15g) whose magnitude at the end of each pulse-to-pulse interval is inversely proportional to its duration. This value is separated and stored in the analog storage device 37 (curve 112 in FIG. 15h) whose first input accepts, as control signals, undelayed pulses (curve 107 in FIG. 15c) fed from the output of the OR circuit 34. This analog quantity is further converted, in the analog-to-digital converter 43, into a digital code and stored in the digital storage unit 44. After a time interval, which is somewhat less than the horizontal scanning period $T_1$, information is retrieved from the digital storage 44 (curve 113 in FIG. 15i) at the desired instant. In this manner, information on the magnitude of the average interpulse component in the geometrical distortion corrector 9 is retrieved with a delay equal to the horizontal scanning period $T_1$.

In order to compensate for this delay, additional delay units rated for a period equal to the horizontal scanning period $T_1$ may be connected to first and second inputs of the corrector 6 and to the first input of the control signal generator 10. The functional block diagram of the geometrical distortion corrector 9, shown in FIG. 6, is a simplified circuit illustrating only general principles of its operation. Thus, for example, this block diagram omits, for simplicity, control circuits responsible for data addressing in the digital storage unit 44, both during the recording and readout processes.

The corrector 9 of geometrical distortions of the displayed image, whose functional block diagram is shown in FIG. 7, differs from the previous embodiment in that, first, the average interperiod component of the scanning speed is located between the leading, and not trailing, edges of the contours, second, the previously sought-for hyperbolic relationship between the average interpulse component and the duration of a respective time interval is replaced by its exponential approximation, and, third, an analog shift register is used as a buffer storage.

Figure 16:
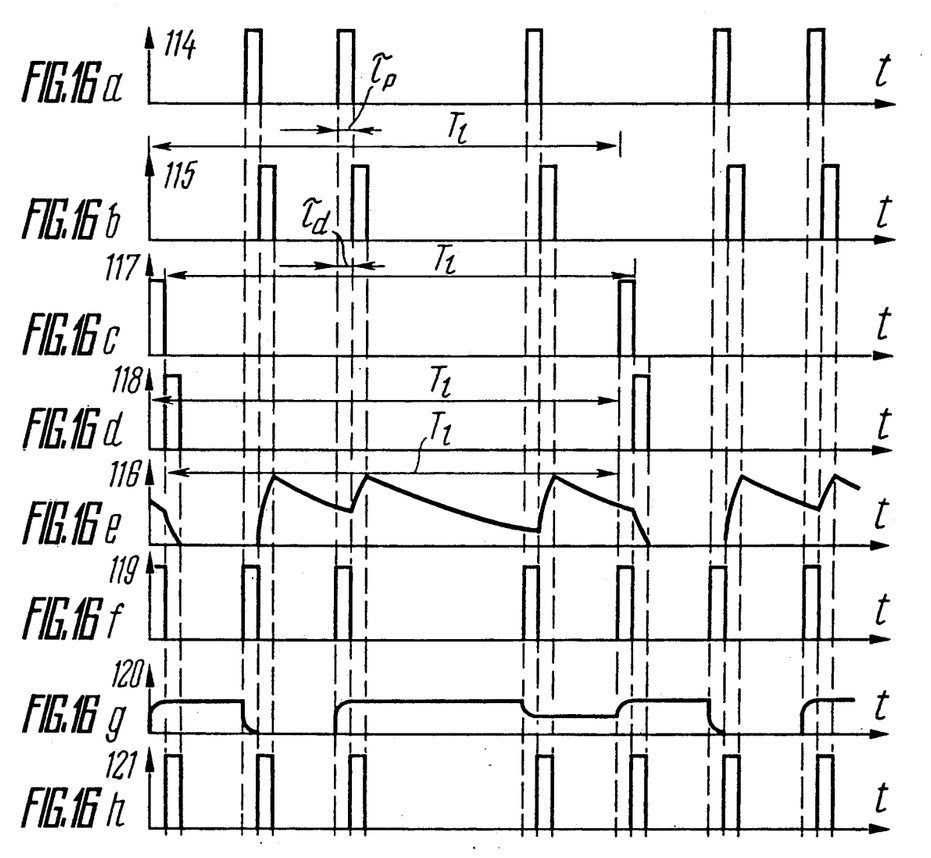

Pulses fed from the treshold unit 8 (curve 114 in FIG. 16a) and delayed in the delay unit 46 for a period approximately equal to the pulse duration, that is $\tau_d = \tau_p$ (curve 115 in FIG. 16b), rapily charge the capacitor (not shown) of the peak detector 48 to a voltage equal to the sweep of these pulses (curve 116 in FIG. 16e). The capacitor of the peak detector 48 is then discharged exponentially with a specific preset time constant which is less than the horizontal scanning period $T_1$.

The output voltage of the peak detector 48 changes exponentially (curve 116 in FIG. 16e). After the forward stroke of the horizontal scanning is over, the capacitor of the peak detector 48 discharges in a horizontal sync pulse (curve 117 in FIG. 16c) delayed in the delay unit 47 (curve 118 in FIG. 16d) for the period $\tau_d = \tau_p$. Undelayed horizontal sync pulses (curve 117 in FIG. 16c) and pulses produced by the threshold unit 8 (curve 114 in FIG. 16a) are united into a sequence in the OR circuit 52 (curve 119 in FIG. 16f), which is used to sample the exponential voltage (curve 116 in FIG. 16e) produced by the peak detector 48 at the end of the interpulse interval (curve 120 in FIG. 16g) in the first analog storage unit 51, of the analog shift register 50. The same sequence of pulses delayed in the delay unit 53 (FIG. 7) of the analog shift register 50 for a period $\tau_d = \tau_p$ (curve 121 in FIG. 16h) is used to transfer the stored analog quantity from the first to the second storage unit 51 of the analog shift register 50 (curve 122 in FIG. 16i).

When a next pulse from the above sequence arrives at the output of the OR circuit 52, the first analog storage unit 51 of the analog shift register 50 stores a next average interpulse component at the output of the peak detector 48 (curve 120 in FIG. 16g), while the preceding quantity is shifted to the third analog storage unit 51 of the analog shift register 50 (curve 123 in FIG. 16j).

When a next pulse from the output of the OR circuit 52 arrives, the first analog storage unit 51 stores a new analog quantity of the average interpulse component, while other uneven analog storage units 51 shift the analog quantities from the preceding even analog storage unit 51. When these pulses (curve 119 in FIG. 16f) are over, the delayed pulses (curve 121 in FIG. 16h) shift all quantities from the uneven analog storage units 51 to subsequent even analog storage units 51 of the analog shift register 50.

Since N outputs of all uneven analog storage units 51 are connected to N inputs of the multiplexer 56, any analog value of the average interpulse component can be transferred to the output in response to control voltages (curves 124, 125, 126 in FIGS. 16p, 16r, 16s) fed from respective stages of the reversible counter 54 where the address of the analog storage unit 51 of the analog shift register 50 is produced. This address indicates where the value of the analog quantity of the average interpulse component of the scanning speed (curve 127 in FIG. 16u) should be taken off.

The control signal generator 10 whose electrical circuit is shown in FIG. 8 operates as follows.

The signal of average interpulse components of the scanning speed (curve 128 in FIG. 17a) is inverted in the analog inverter 57 and supplied to the input of the integrator 58. Also applied to this input of the integrator 58 are pulses from the output of the corrector 9 (curve 129 in FIG. 17b). The result of integration is a triangular voltage of the desired magnitude and polarity (curve 130 in FIG. 17c), which is output amplifier 11 into triangular current.

Figure 17:
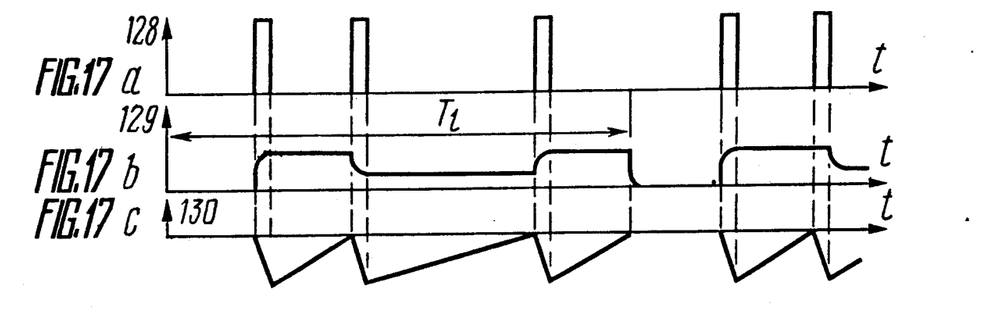

In the control signal generator 10 whose electrical circuit is shown in FIG. 9, both input signals (curves 128 and 129 in FIGS. 17a and 17b) are supplied to the input of the difference amplifier 70 whose output signal is fed to the integrator 71 producing the same triangular voltage (curve 130 in FIG. 17c).

The device for display of information, disclosed herein, achieves a complete arrest of the scanning beam for the period when image contours (or edges) are displayed. In this manner, any effect of the insufficient resolution of data generation and storage units on the size of the resulting unsharpness zone is eliminated. In consequence, the sharpness of the displayed images is almost doubled. In addition, any distortions of image brightness and geometrical shape, which may be caused by variations in the horizontal scanning speed, are practically eliminated too.

This invention can be used for reproduction of information as two-gradation (in computer displays, radar indicators) or half-tone (as in television receivers, or closed-circuit television monitors) black-and-white or color pictures.

We claim:

1. A device for displaying information, comprising: a receiver unit having a line sync output, a frame sync output, at least one information output, and an input connected to a source of an information signal, and to receive, amplify and separate an information video signal, as well as line and frame synchronizing signals; horizontal and vertical scanning generators to produce a standard pattern and having their inputs connected, respectively, to the line and frame sync outputs of the receiver-amplifier unit; an information video signal-to-image converter, which is to produce an image and has a first input connected to an output of the horizontal scanning generator, a second input connected to an output of the vertical scanning generator, and a third input electrically connected with the information output of the receiver-amplifier unit; an output amplifier having an output connected to a fourth input of the signal-to-image converter; a detector of contours of the displayed image, which is to produce a signal to control horizontal scanning during display of the image contours and has an input connected to the information output of the receiver-amplifier unit; a threshold unit connected to an output of the image contour detector and to obtain, when displaying image contours, an insignificant horizontal scanning speed, a control signal generator which produces sawtooth voltage when displaying image contours and has an input connected to the output of the threshold unit and an output connected to the input of the output amplifier to convert the sawtooth voltage into sawtooth current producing a deflection field having the same strength as the field produced by the horizontal scanning generator but of opposite polarity.

2. A device as claimed in claim 1, further comprising a displayed image geometric distortion corrector to prevent spacial shifts of the image contours which has a first input connected to the output of the threshold unit, and a second input connected to the line sync output of the receiver-amplifier unit, and an output connected to a second input of the control signal generator.

3. A device as claimed in claim 2, further comprising a corrector of luminance distortions of the displayed image, to prevent distortions of brightness levels of the contours and background and being inserted between the information output of the receiver-amplifier unit and the third input of the signal-to-image converter, a second input of said luminance distortion corrector being connected to the output of the threshold unit, while a third input is connected to the output of the geometrical distortion corrector.

4. A device as claimed in claim 3, further comprising two additional correctors of luminance distortions of the displayed image, which are to correct intensity levels of chrominance signals and have first inputs connected respectively to the second and third information outputs of the receiver-amplifier unit, second inputs connected to the output of the threshold unit, third inputs connected to the output of the geometrical distortion corrector, and outputs respectively connected to the fifth and sixth inputs of the signal-to-image converter.

5. A device as claimed in claims 3 or 4, wherein the luminance distortion corrector comprises a difference amplifier to subtract the signal produced by the threshold unit from the original information signal summed up with the signal produced by the geometrical distortion corrector, said difference amplifier having a first input connected to the output of the threshold unit, a second input connected to the output of the geometrical distortion corrector, a third input connected to an information output of the receiver-amplifier unit, and an output connected to a third input of the signal-to-image converter.

6. A device as claimed in claim 2, wherein the corrector of geometrical image distortions comprises delay units, an analog storage unit, an OR circuit having a first input connected to the output of the threshold unit and to the first input of analog storage unit, a second input connected to the line sync output of the receiver-amplifier unit and to the second input of the unit, and an output connected to inputs of the respective delay units, a logarithmic amplifier, a differentiating network, a sawtooth voltage generator having an input connected to the output of the delay unit and an output connected to the logarithmical amplifier coupled with the differentiating network having an output connected to a second input of the analog storage unit, an analog-to-digital converter, a digital-to-analog converter, a digital storage unit having a first input connected to the delay unit, a second input connected to the output of the analog-to-digital converter coupled with the output of the analog storage unit, while an output of the digital storage unit is connected to the digital-to-analog converter an output of which is the output of the geometrical image distortion corrector, and is connected to the input of the control signal generator.

7. A device as claimed in claim 2, wherein the corrector of geometrical image distortions comprises a peak detector, an electronic switch, an analog shift register, a first delay unit having an input connected to the output of the threshold unit and an output connected to the peak detector, a second delay unit having an input connected to the line sync output of the receiver-amplifier unit and an output connected to a control input of the electronic switch having one signal output connected to a common bus, while the other output thereof is connected to a second input of the peak detector having an output connected to a signal input of the analog shift register, an OR circuit having one input connected to the output of the threshold unit, the other input connected to the line sync output of the receiver-amplifier unit, and an output connected to the control input of the analog shift register, a reversible counter, a delay unit having an input connected to the output of the OR circuit and an output connected to the subtracting input of the reversible counter having a summing input connected to the output of the OR circuit, and a multiplexer having N signal inputs connected to N outputs of the analog shift register, M control inputs of which are connected to outputs of the reversible counter, M being greater than or equal to log N, while an output of the multiplexer is the output of the corrector of geometrical image distortions, which is connected to the input of the control signal generator.

8. A device as claimed in claim 7, wherein the analog shift register comprises 2N-1 series connected analog storage units, uneven storage units have outputs connected to signal inputs of the multiplexer, and a delay unit has an input connected to control inputs of uneven analog storage units and an output connected to control inputs of the analog storage units.

* * * * *